United States Patent [19]

Perkins

[11] Patent Number: 5,137,358
[45] Date of Patent: Aug. 11, 1992

[54] RING LASER GYRO HAVING TWO MAGNETIC MIRRORS

[75] Inventor: Harley A. Perkins, Brookline, Mass.

[73] Assignee: Northrop Corporation, Hawthorne, Calif.

[21] Appl. No.: 651,717

[22] Filed: Feb. 5, 1991

[51] Int. Cl.⁵ .............................................. G01C 19/68
[52] U.S. Cl. ..................... 356/350; 372/94; 372/107
[58] Field of Search ................... 356/350; 372/94, 107

[56] References Cited

U.S. PATENT DOCUMENTS

| | | |
|---|---|---|
| 3,581,227 | 5/1971 | Podgorski . |
| 3,649,931 | 3/1972 | Macek . |
| 3,851,973 | 12/1974 | Macek ............................... 356/350 |
| 3,862,803 | 1/1975 | Yntema et al. . |
| 3,973,851 | 8/1976 | Ferrar . |
| 4,009,933 | 3/1977 | Firester . |
| 4,195,908 | 4/1980 | Kestigian et al. .................... 356/350 |
| 4,201,954 | 5/1980 | van der Wal et al. .............. 356/350 |
| 4,268,799 | 5/1981 | McCrickerd . |
| 4,271,397 | 6/1981 | Stiles et al. . |
| 4,410,276 | 10/1983 | Ljung et al. ......................... 356/350 |
| 4,442,414 | 4/1984 | Carter ................................. 356/350 |
| 4,522,496 | 6/1985 | Sanders . |
| 4,592,656 | 6/1986 | Egli ..................................... 356/350 |

FOREIGN PATENT DOCUMENTS 0267672 5/1988 European Pat. Off. ............ 356/350

*Primary Examiner*—Samuel A. Turner
*Attorney, Agent, or Firm*—Terry J. Anderson; Robert B. Block; Karl J. Hoch, Jr.

[57] ABSTRACT

Method and apparatus for switchably controlling the bias of a ring laser angular rate sensor using two switchably controllable magnetic mirrors for rate sensor operation away from lock-in regions. For a sensor input rate that is less than a threshold value, a control means switchably energizes each of the magnetic mirrors in a manner such that their respective optical effect is additive, one with the other, for biasing the rate sensor at a first desired operating point. For a sensor input rate that is at least equal to the threshold value, the control means switchably energizes each of the magnetic mirrors in a manner such that their respective optical effect is subtractive, one from the other, for biasing the rate sensor at a second desired operating point.

20 Claims, 2 Drawing Sheets

MMs ADDITIVELY SWITCHED

MMs SUBTRACTIVELY SWITCHED

APPLIED FIELDS TO SWITCH MAGNETIC FILMS

RING LASER GYRO HAVING TWO MAGNETIC MIRRORS

FIELD OF THE INVENTION invention relates generally to ring lasers and, in particular, relates to a ring laser gyroscope (RLG) that includes two magnetic mirrors for enabling operation at all desired rotation rates while avoiding lock-in.

BACKGROUND OF THE INVENTION

A ring laser employs two beams of light propagated along the same path in opposite directions around a closed path reentrant cavity. In an ideal ring laser, the frequency difference between the beams of light is zero when the ring is stationary but moves from zero when the ring is rotated about an axis perpendicular to the lasing plane, the frequency difference being proportional to the angular rotation rate of the cavity. The two beams are combined using a prism to produce an interference pattern of "fringes". The fringes are stationary if the two beams are of identical frequency and have a constant phase displacement. The fringes change at a rate proportional to any difference in frequency of the two beams A photodiode detects the motion and provides a corresponding electrical signal. As such, a ring laser is capable of functioning as a rate gyroscope. However, there are many effects that degrade ring laser performance. One of the most dominant, and hence troublesome, effect is known as lock-in. Lock-in is caused by light scattered from a beam interacting with the oppositely propagating beam. One effect of this interaction is the suppression, at low rotation rates, of the frequency difference between the beams. Another effect of this interaction causes the frequency difference vs input angular rate to exhibit non-linear behavior and increased phase noise for input rates near the lock-in threshold.

When a ring laser is used as a gyroscope, known as an RLG, the two output light beams are combined to provide interference fringes which are counted by a photodetector. The fringe count is directly proportional to the total angle the ring laser has turned through, provided the two beams of light are completely uncoupled. The ratio of the fringe count per unit angle of rotation is known as the gyro scale factor. However, as a result of lock-in, no fringes will occur up to the lock-in threshold and the scale factor will be non-linear for a range of rotational rates near the lock-in threshold. As can be realized both of these phenomena seriously degrade the accuracy of the RLG.

Various techniques to avoid lock-in have been employed, ranging from a mechanical dithering arrangement that oscillates the entire ring laser at a small amplitude to magneto-optical biasing arrangements. The magneto-optical method imparts a bias to the ring laser by introducing a non-reciprocal phase shift to the counter-propagating light beams. Magneto-optical arrangements generally fall into two broad categories, namely Faraday cells and magnetic bias mirrors. In the Faraday cell biasing devices, a paramagnetic or ferrimagnetic material, transparent to the laser wavelength, is inserted in the cavity in the paths of the two light beams. This arrangement suffers the disadvantage that additional high quality, and hence expensive, optical components need be employed and furthermore, these components may give rise to increased light scatter thereby increasing the lock-in problem.

Patents related to this technology include U.S. Pat. 3,649,931, Mar. 14, 1972 to Macek entitled "Compensated Frequency Biasing System for Ring Laser" which shows the use of a Faraday bias cell system. U.S. Pat. No. 3,862,803, Jan. 28, 1975, to Yntema et al. entitled "Differential Laser Gyro System" also shows the use of a Faraday cell. A U.S. Pat. No. 3,973,851, Aug. 10, 1976 to Ferrar entitled "Dispersion Compensated Laser Gyro (U)" provides an axial magnetic field to a laser gain medium and, through the Zeeman Effect, provides a displacement between gain versus frequency profiles for counter-rotating waves.

A magnetic bias mirror typically replaces one of the usual three "corner" mirrors of the RLG in a manner disclosed in, for example, commonly assigned U.S. Patent Application Ser. No. 07/239,724, filed Sep. 2, 1988, entitled "Ring Laser Gyro and Magnetic Mirror Therefor", H. Lim et al. In use, a rapidly switchable magnetic field is generated by conductors near and preferably embedded in a mirror substrate. The S-mode polarization is suppressed by the use of a small perimeter, odd-number of mirrors configuration and/or with multilayer dielectric coatings. The resulting single P-mode operation is achieved without Brewster angle windows and the attendant birefringence and increased scatter problems.

This successful technique for avoiding lock-up phenomena in an RLG employs magnetic "dithering" obtained from a thin magnetic coating that forms a reflective surface of the mirror. This technique involves operating the RLG to produce only a P-polarized beam of light so that a transverse Kerr effect interaction of the light and the magnetic field at the magnetic thin film coated surface results in a non-reciprocal phase shift of the light travelling in the two counter-propagating beams. A consequence of this phase shift is a frequency split between the two beams when the gyro is unmoving in its inertial frame. Without the "magnetically induced bias" imparted by the magnetic mirror (MM) the RLG would produce zero output frequency until an associated lasing plane is rotated in inertial space at an output rate greater than the lock-in threshold. The magnetic bias provided by the MM overcomes this problem by maintaining the RLG out of the lock-in state.

As such, and as can be seen in FIG. 2, the MM effectively offsets the curve of output frequency vs. gyro rotation rate by an amount equal to the magnetically induced bias. When the MM is fully set in one of its two possible stable directions along an associated "easy" axis (determined during magnetic film deposition), the bias induced by the MM shifts the curve to a more positive angular rotation rate. When the MM is fully set to the opposite stable state along the easy axis, the curve is shifted to a more negative angular rotation rate. The lock-in region is correspondingly offset to straddle the bias value. The behavior for the two states of MM is symmetrical in regard to the magnetically induced bias produced. One advantage of this symmetry is a short term cancellation of a slowly varying bias magnitude due to, for example, temperature variations in the magnetic film, the short term cancellation being obtained through the use of a procedure that calculates the actual or true rotational rate by summing the total fringe counts over each full cycle of the mirror switching frequency.

However, it has been observed that for rotation rates in the vicinity of the MM bias offset, where lock-in tends to occur, two undesirable effects result: (1) the random noise output from the gyro tends to increase greatly, and (2) the actual output frequency deviates significantly from a desired straight line relationship of frequency versus input rotation rate.

One solution to this problem in order to maintain a low noise level involves stopping the symmetrical switching of the MM when the rotation rate nears one of the two MM bias offset values, and leaving the MM switched to a state which is farthest from lock-in.

However, in operation the symmetry of bias offset and cancellation of bias variations due to temperature and other variables is not available to the system employing the RLG while the MM is not being switched. To eliminate errors, any such variations are therefore required to be "modelled" and included in a correction algorithm run by a true rate, or navigational, computer. Such compensation or correctional techniques add to the complexity and could reduce the accuracy of the rotational rate sensing system.

Other patents of interest include the following. A U.S Pat. No. 4,592,656, Jun. 3, 1986, to Egli discloses a ring laser angular rate sensor having laterally positionable mirrors 2 and 3 for modulating scattered waves at a constant rate in integer multiples of 2(pi) radian phase change. In U.S. Pat. No. 4,410,276, Oct. 18, 1983, Ljung et al. discloses a ring laser gyroscope constructed as an isosceles triangle with two symmetrical mirrors arranged to reflect light at an angle such that equal and opposite vibration of the two mirrors relative to an area within the triangle can be carried out at an amplitude that corresponds exactly to one Bessel function zero. A third angle supplementary to but different from the first two angles is selected such that the displacement of the point of reflection on an associated reflector surface corresponds to another Bessel function zero.

The following two U.S. Patents generally describe magnetic mirrors. A U.S. Pat. No. 3,851,973, Dec. 3, 1974 to Macek entitled "Ring Laser Magnetic Bias Mirror Compensated for Non-Reciprocal Loss" and a U.S. Pat. No. 4,195,908, Apr. 1, 1980 to Kestigian et al. entitled "Magnetic Mirror for Imparting Non-Reciprocal Phase Shift".

A U.S. Pat. No. 4,522,496, Jun. 11, 1985 to Sanders entitled "Laser Gyro Mode Locking Reduction Scheme" describes in one embodiment the extraction of one of the primary waves from the ring laser path through a partially reflective mirror, the extracted wave being acted upon by a mirror oscillating at an angular frequency which doppler-shifts the frequency of the extracted wave. The doppler-shifted mode is reintroduced into the ring laser path to diminish the range of lock-in frequency of the primary modes.

The following patents generally describe various reflectors suitable for use in lasers or laser gyroscopes. A U.S. Pat. No. 4,442,414, Apr. 10, 1984, to Carter entitled "Magneto-Optical Phase-Modulating Devices", U.S. Pat. No. 4,009,933, Mar. 1, 1977, to Firester entitled "Polarization-Selective Laser Mirror", U.S. Pat. No. 4,268,799, May 19, 1981, to McCrickerd entitled "Curved Mirror Lasers and Methods of Operating Same", U.S. Pat. No. 4,201,954, May 6, 1980 to van der Wal et al. entitled "Gas Discharge Laser for Generating Linearly Polarized Radiation", U.S. Pat. No. 4,271,397, Jun. 2, 1981 to Stiles et al. entitled "Nonreciprocal Phase Shifter for a Ring Laser Gyro" and U.S. Pat. No. 3,581,227, May 25, 1971 to Podgorski entitled "Adjustable Thin Membrane Mirror for Use in the Stabilization of Ring Lasers". EP 267672A, entitled "Mirrors of Polarization Sensitive Reflectivity", describes a multi-layer dielectric stack mirror for a laser gyroscope.

However, none of the aforementioned patents either singularly or taken together either solves or suggests a solution to the problem of maintaining scale factor linearity or a low noise level when the angular rotation rate of a ring laser angular rotation rate sensor nears one of two MM bias offset regions.

It is thus an object of the invention to overcome the foregoing problems by enabling the RLG to operate at all desired rotation rates without closely approaching the lock-in region.

It is another object of the invention to overcome the foregoing problems by enabling a ring laser angular rate sensor to operate at all desired rotation rates without closely approaching the lock-in region by providing first and second magnetic mirrors within the optical cavity and by operating the two magnetic mirrors either in an additive mode or in a subtractive mode of operation.

SUMMARY OF THE INVENTION

The foregoing problems are overcome and the objects of the invention are realized by a ring laser angular rate sensor that includes apparatus for generating two counter-propagating optical beams traveling in opposite directions about an optical path defined by a plurality of reflectors. In accordance with the invention a first one of the reflectors includes a first magnetic mirror and a second one of the reflectors includes a second magnetic mirror. Each of the magnetic mirrors is coupled to and responsive to an associated input from a mirror control device for being controllably energized thereby for biasing the ring laser angular rate sensor to a desired operating point.

In accordance with a method of the invention of operating a ring laser angular rate sensor the following steps are accomplished: (a) for a first range of angular rotational rates that does include a lock-in region controllably operating a magnetic mirror disposed within an optical path of the rate sensor for biasing the rate sensor at a desired operating point, and (b) for a second range of angular rotational rates that does not include a lock-in region effectively removing the magnetic mirror from the optical path of the rate sensor. The step of controllably operating includes a first step of switchably energizing a first magnetic mirror and a second magnetic mirror in a manner such that their respective magneto-optical phase shift effect is additive one with the other. The step of effectively removing includes a second step of switchably energizing the first magnetic mirror and the second magnetic mirror in a manner such that their respective magneto-optical phase shift effect is subtractive one from the other.

The method further includes the steps of comparing the angular rotation rate to a threshold value and selecting for execution either the first step of switchably energizing or the second step of switchably energizing. The step of selecting is accomplished as a function of the value of the angular rotational rate relative to the MM bias value, the selected value being a predetermined value which tends to maintain a least amount of noise over a range of rotational rates of the ring laser angular rate sensor and/or maximize the scale factor linearity. Both advantages are achieved at approximately the same selected value although minimum noise may not exactly conform to maximum scale factor linearity. However, either value may be optimized depending on the mission requirements of an application of the gyro.

BRIEF DESCRIPTION OF THE DRAWING

The above set forth and other features of the invention will be made more apparent in the ensuing Detailed Description of the Invention when read in conjunction with the attached Drawing, wherein.

DETAILED DESCRIPTION OF THE INVENTION

Figure 1:
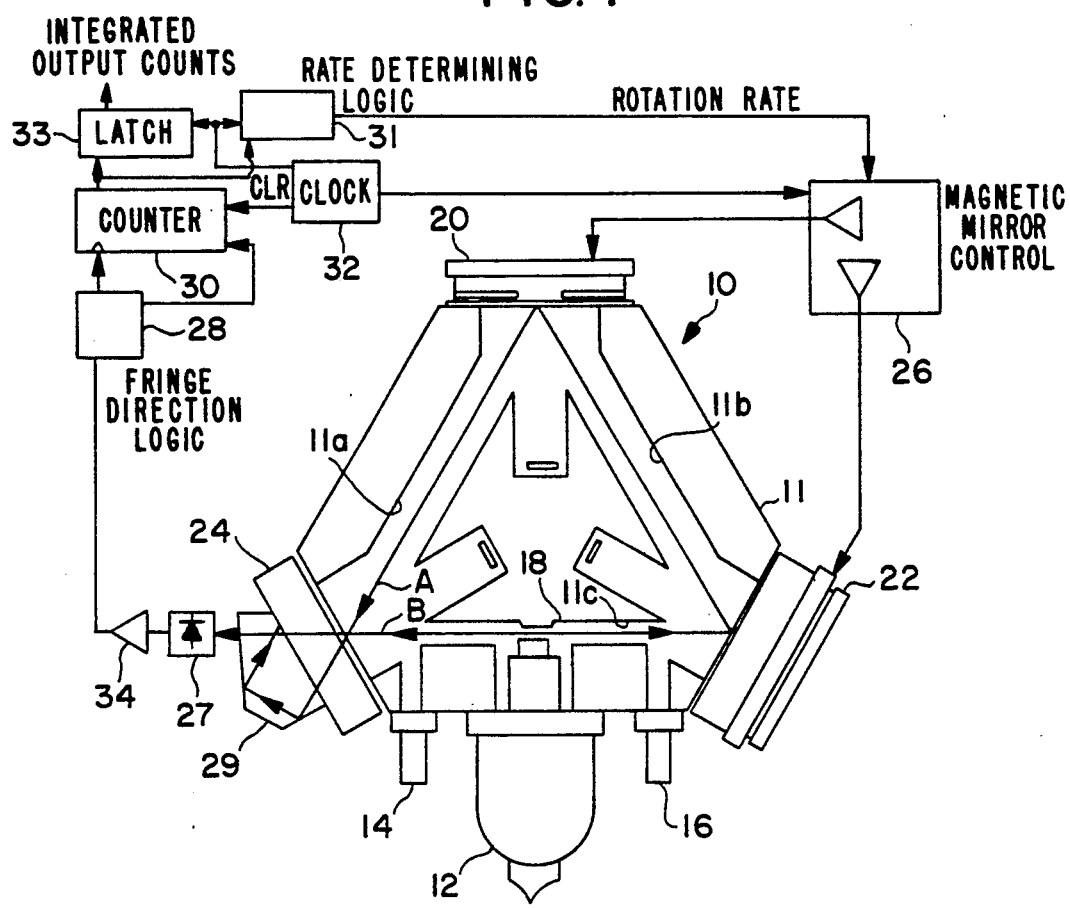
FIG. 1 is a simplified plan view of a RLG constructed and operated in accordance with the invention including two magnetic mirrors and electronic circuit modules to control the additive/subtractive magnetic mirror energization.
Figure 2:
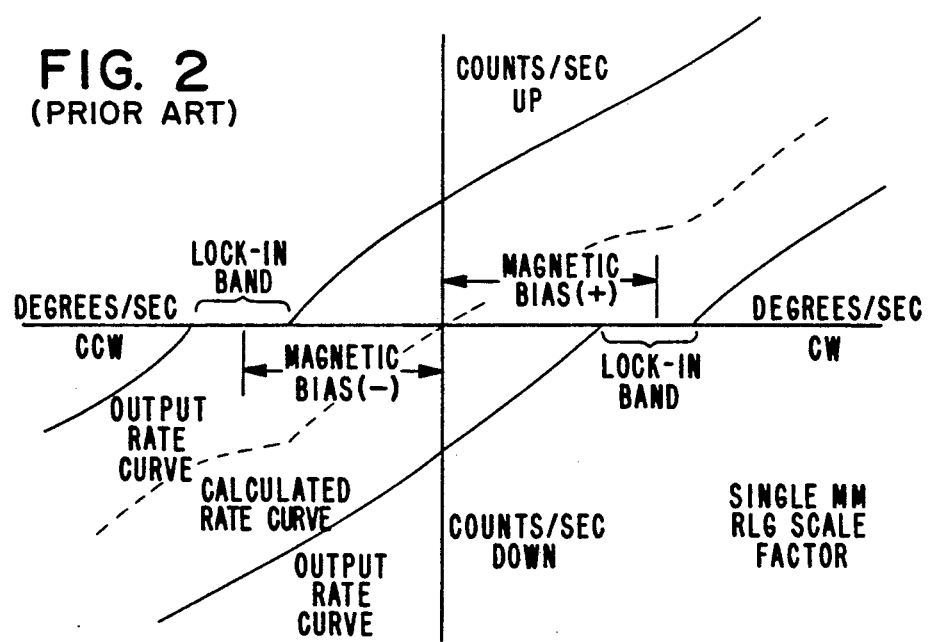
FIG. 2 is a graph showing the effect of a single magnetic mirror of the prior art upon the operation of a RLG.

Referring to FIG. 1 there is illustrated a simplified top view of a RLG 10 constructed in accordance with the invention. This description is made in the context of an RLG similar in some respects to that disclosed in aforementioned commonly assigned U.S. Patent Application Ser. No. 07/239,724, Sep. 2, 1988, entitled "Ring Laser Gyro and Magnetic Mirror Therefor", H. Lim et al.. It should be realized however that the teaching of the invention is applicable to ring laser rate sensors in general and is not to be construed to be limited to only the embodiment set forth in the ensuing description.

RLG 10 includes a block 11 including a triangular optical path defined by internal bores 11a, 11b and 11c. These bores define an optical perimeter of the RLG 10. By example the perimeter may be 15 centimeters. Three reflectors or mirrors (20,22,24) are mounted at the apexes of the triangle for reflecting counter-propagating light beams A and B. A cathode 12 and anodes 14 and 16 combine to generate a discharge in a helium-neon lasing medium. However, only a single gain leg 18 requires a precision bore. The small perimeter, triangular configuration produces a large frequency splitting between adjacent S (out of plane) and P (in plane) linearly polarized lasing modes. In FIG. 1 a lasing plane of the RLG 10 is taken to be a plane parallel to a plane of the paper.

In accordance with the invention the triangular configuration of the RLG 10 is defined by the three mirrors, specifically a first magnetic mirror 20, a second magnetic mirror 22, which in the illustrated embodiment also functions in a conventional manner as a path length control mirror, and a partially reflective, partially transmissive output mirror 24. P-mode operation is maintained by a path length piezoelectric servomechanism (not shown) operating on the mirror 22. A Magnetic Mirror Control (MMC) mechanism 26 has an input for receiving the measured angular rotation rate of the RLG 10 and is responsive thereto for switchably energizing the magnetic mirrors 20 and 22 in a desired mode of operation as will be described. The RLG 10 is contacted at the three apexes with the mirrors 20, 22, and 24 to form a sealed, unitary assembly. The MMs 20 and 22 may be constructed as described in the aforementioned commonly assigned U.S. Patent Application Ser. No. 07/239,724, Sep. 2, 1988, entitled "Ring Laser Gyro and Magnetic Mirror Therefor", H. Lim et al.. In this regard the MM 22 is constructed to function as a dual purpose magnetic mirror and path length control mirror. Such modification primarily involves the addition of field windings to the mirror for energizing an internally disposed thin-film layer comprised of an anisotrophic magnetic alloy (zero magnetostriction alloy). A MM could also be used as an output mirror but this is not done because, typically, the available output light transmitted through the MM is lower than that transmitted through a conventional output mirror.

As will now be shown the structure illustrated in FIG. 1 is an improvement to the magnetically "dithered" RLG having a single MM.

Magnetic mirrors must have the reflectivity of the magnetic film coating enhanced by a dielectric stack coating (typically alternating quarter wavelayers of two materials having two different dielectric constants) in order to achieve overall cavity losses which are less than the available optical gain of the laser discharge. A dielectric stack having a greater number of $\frac{1}{4}$ wave layers shows a higher reflectance or lower loss. Ideally one prefers the maximum practically obtainable reflectance from all of the RLG mirrors except for the output mirror which is designed to transmit sufficient light to permit proper operation of the photodiode sensor element. In the case of the magnetic mirror the naked magnetic film itself is reflecting typically on the order to 60% so that a high reflectance is obtainable with relatively fewer $\frac{1}{4}$ wave layers than a mirror with only a dielectric stack and no underlying coating such as that inherent in the magnetic mirror. Because the laser light must penetrate the dielectric stack to be phase shifted by means of the longitudinal Kerr magneto-optic effect, magnetically induced bias in the RLG is a function of the thickness of the dielectric stack deposited over the magnetic film. Thus, as reflectance is increased, magnetic mirror bias is decreased in an approximately linear relationship around the region of practical interest for RLG operation. As such, the MM dielectric coating layers can be adjusted in number to produce a specific magnetic bias at a corresponding reflectivity. The bias can be apportioned between two magnetic mirrors such that together the total magnetic bias obtained in the gyro is the same as that obtained from a single magnetic mirror. The resulting reflectance of the two magnetic mirrors together is the same as the reflectance of a single MM which provides the same amount of bias.

Assuming now that each of the two mirrors 20 and 22 has the same optical properties as a single magnetic mirror it is observed that the RLG 10 is biased at an amount twice as great as either single mirror when both of the MMs 20 and 22 are set to the same direction relative to the lasing plane. Furthermore if both of the MMs 20 and 22 are switched together the RLG 10 bias alternates plus and minus around the average output information rate. The advantages of high stability in bias drive achieved by averaging plus and minus state information are thus realized. Temperature stability of the calculated output rate has been observed to be improved by a factor of ten when switching the MMs 20 and 22 rather than leaving the MMs in one state. As was discussed, when the RLG is being turned at a rate that approaches the lock-in band, the band typically being a few degrees per second in width centered on the MM bias rate, random noise in the data increases greatly as the edge of the lock band is approached. For this reason, the RLG is preferably not operated such that the magnetic mirror switches the RLG nearly into lock-in.

Figure 3:
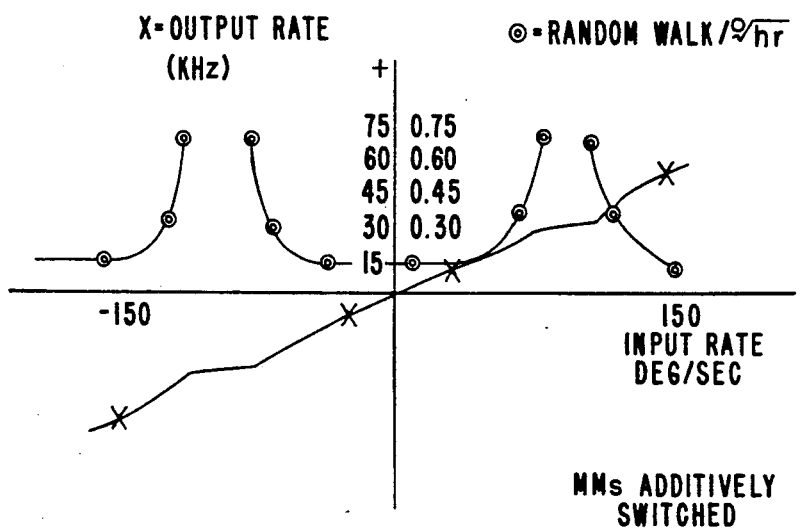
FIG. 3 is a graph showing the effect upon RLG operation of two magnetic mirrors operated in an additive mode.

With the two MM's 20 and 22 of the invention lock-in is avoided because two modes of MM operation are readily available. An effect of a first mode of operation is illustrated in FIG. 3 and involves switching the two MMs 20 and 22 simultaneously such that the optical effect, specifically the bias offsets of the two mirrors, are additive. The effect of this in-phase or additive switching on both the RLG 10 output rate and random walk is illustrated over an input rate of $-150°$/SEC to $+150°$/SEC. For the graph of FIG. 3 both the MMs 20 and 22 are being switched. Output optical fringes are shown as moving in a positive (+) direction for positive input rate and vice versa (−) for negative input rate.

Figure 4:
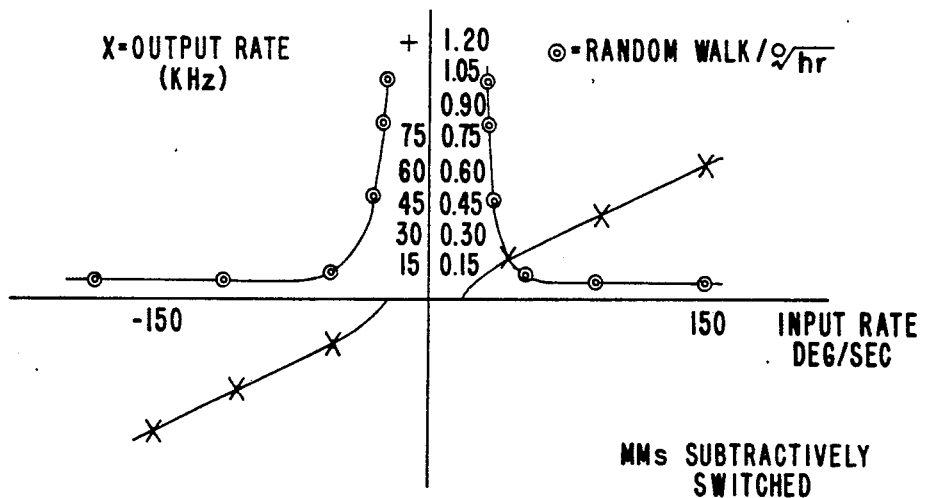
FIG. 4 is a graph showing the effect upon RLG operation of two magnetic mirrors operated in a subtractive mode.

An effect of a second mode of operation is illustrated in FIG. 4 and involves switching the two MMs 20 and 22 simultaneously such that the bias offsets of the mirrors are subtractive. The effect of this out-of-phase or subtractive switching on the RLG 10 output rate and random walk is illustrated over the input rate of $-150°$/SEC to $+150°$/SEC and at the same scale factor and gyro bias as in FIG. 3. For the graph of FIG. 4 both the MMs 20 and 22 are being switched.

As can readily be seen if each of the MMs 20 and 22 provides substantially identical bias offsets the result is a substantially zero bias offset for the subtractive mode. Thus, the MMs 20 and 22 are effectively removed from actively biasing the RLG 10 when operating in the subtractive mode. Moreover, if a variation in bias due to, for example, temperature is the same in both MMs 20 and 22 the cancellation remains effective over a wide range of environmental temperature.

In accordance with the invention MMC 26 functions to operate the MMs 20 and 22 in the additive mode for zero and low rates of RLG 10 angular rotation and further functions to switch to the subtractive mode for angular rotation rates greater than approximately one half of the offset bias rate of the two MM's 20 and 22 when taken together. Thus, a relatively simple control technique changes the mode of the MMs 20 and 22 when the calculated actual rotational rate exceeds a specific value. An optimal rotational rate value for the mode switch-over point is that value which tends to maintain a least amount of noise over a full range of rotation of the RLG 10. Alternatively, the mode switch-over point may be a value selected to minimize scale factor error at all input rates, although both benefits are achieved at approximately the same switch over point.

It should be realized that the following description of an electronic control system is but one suitable means to control the operation of the two magnetic mirrors 20 and 22.

The gyro's optical output clockwise and counterclockwise beams are combined in a prism 29 and are sensed by a photodiode 27. Amplifier 34 amplifies the signal level from the photodiode 27 and outputs essentially a square waveform to the direction logic circuits 28. The relative motion of the optical fringes across the photodiode may be determined by using a dual diode positioned on the prism 29 such that the optical sinusoidal waveform peak impinges on first one of the diodes and then upon the other as a result of relative fringe motion as sensed by electrical outputs of the diode. This technique requires a separate amplifier for each diode. The pair of outputs are impressed on the direction logic 28 which determines the relative waveform sequence by comparing waveform edges for each of the two waveforms. The direction logic 28 provides two outputs to an up-down digital counter 30. These are the output pulses corresponding to relative fringe motion and a direction sign to instruct the counter 30 to increment or decrement the counts. Integrated net output counts (i.e. total counts per n full magnetic mirror cycles) are available to a navigation system from a digital latch 33. These integrated counts correspond directly to the total angular rotation of the gyro 10 since a time when the counters 30 were last reset by a digital clock 32. The latch 33 is a convenience to maintain a constant output sample during data transmission. A rate determining circuit 31 determines gyro input rate by measuring the number of net counts obtained from counter 30 over each full magnetic mirror cycle. When the measured gyro input rate increases from zero and exceeds approximately 50% to 70% of the equivalent magnetic mirror bias rate, magnetic mirror control 26 changes the mirror switching from additive mode to subtractive mode. If the input rate decreases to below approximately 50% to 70% of the equivalent MM bias rate during a time when the mirror switching mode is subtractive, the mode is changed back to additive.

The method of fringe direction detection as described is but one method for determining relative output polarity and was provided to clarify control of the two magnetic mirrors. However, the teaching of utilizing two magnetic mirrors to improve scale factor linearity and reduce gyro noise is not limited to the specific electronic control described herein.

Operation of the mirror control circuit 26 is described now in greater detail. The magnetic mirror polarity is periodically reversed as previously discussed to cancel accumulation of magnetic mirror bias on the output data. This reversal occurs very quickly such that the reversal time is small as compared to the width of one inertial data count at the maximum input rate of the gyro 10. A presently preferred drive circuit technique employs two individual orthogonally disposed windings which provide magnetizing fields in the plane of the magnetic film. A properly sequenced application of current drive pulses causes the magnetic film to switch very quickly by magnetic domain rotation. One of two drive windings on each magnetic mirror provides a field, when energized, along the magnetic "easy axis" of an anisotropic magnetic thin film deposited on the mirror substrate. The amplitude of this drive field is controlled to be less than the coercivity of the film, Hc, but greater than the product of the anisotropy field, Hk, and the sine of the easy axis dispersion angle. The easy axis winding is driven with a nearly square pulse of current whose duration is just long enough to assure complete switching (typically 1 to 2 microseconds). The direction of current flow determines the film's magnetization direction after the switching operation is completed in a given direction.

Figure 5:
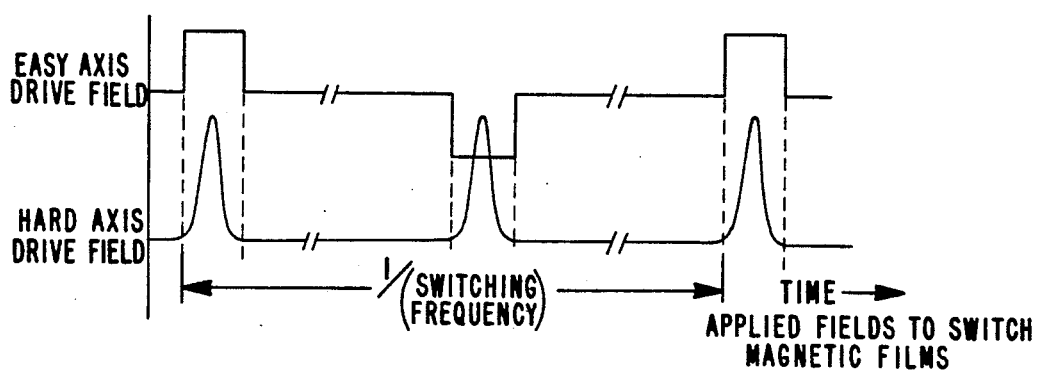
FIG. 5 graphically depicts the fields applied to switch the magnetic mirror films.

In operation, the digital clock 32 applies an input to the easy axis drive circuit which, for one of the two mirrors, causes a nearly square pulse of current in one direction. One half cycle of the mirror frequency later a nearly square pulse of current is applied in the opposite direction, as shown in FIG. 5. The mirror switching frequency is typically 1 Hz to 1000 Hz. In the additive mode, the easy axis winding of the second magnetic mirror receives the same set of square pulses at approximately the same time but from a different current driver whose relative current direction is controlled by the MMC 26. This output is based on the rate signal from the rate determining circuit 31 and sets the second magnetic mirror to the same relationship of the lasing plane as the first magnetic mirror for zero or low gyro input angular rates. Actual mirror switching is initiated by the "hard axis" drive circuit, whose drive winding is positioned orthogonally with respect to the easy axis drive winding and which also provides a magnetic field in the plane of the magnetic film. A single hard axis driver circuit can be interconnected with the hard axis drive windings of both magnetic mirrors 20 and 22; with windings in series such that switching is initiated simultaneously in both of the mirrors 20 and 22. This is possible because the hard axis driver need only supply a unidirectional pulse polarity regardless of the direction of mirror magnetization desired. The hard axis driver is switched on coincidently with a rise of voltage from the easy axis drive circuit as it establishes drive current in the easy axis winding, as depicted in FIG. 5. The hard axis drive current and resulting field is a single pulse whose duration is typically approximately 0.5 microsecond. The easy axis drive field is applied during the pulse width of the hard axis drive current waveform and continues until the hard axis current decreases to nearly zero (typically approximately 1.2 microseconds). Since the thin magnetic film, typically about 1000 Angstroms thick, retains its saturation magnetization no fields need be applied during the remainder of the mirror's half cycle of the switching frequency. In the additive mode, the easy axis drivers set the magnetic film magnetization such that the magnetically induced gyro bias is cumulative. As the input rate becomes greater than some preset threshold value, such as approximately 50% to approximately 70% of the mirror bias, the signal from the rate determining circuit 31 causes the second mirror easy axis driver on the next mirror half cycle to produce a polarity which is the same as the previous polarity had attained a half cycle earlier. Thus, the first mirror will reverse polarity but the second mirror will remain in the same polarity. A half cycle later, both mirrors will reverse polarity but the bias will still be effectively cancelled. This situation continues until the input rate falls below the preset threshold value where the second magnetic mirror will again be controlled by MMC 26 to set the mirror to the same state it acquired one half cycle earlier, with the result providing additive operation of the magnetic mirrors 20 and 22 once again.

Alternatively, rather than continuing magnetic mirror switching, switching may possibly be inhibited when the magnetic mirrors 20 and 22 are in the subtractive mode in that, ideally, the mirrors produce no net bias together. In practice it is difficult to fabricate two magnetic mirrors whose bias is exactly the same in that the exact bias depends critically upon the mirror coating process uniformity. By continuing the switching in the subtractive mode, any bias due to imperfect cancellation is also automatically cancelled over each full cycle of the magnetic mirror, just as in the additive mode. This provides the advantage of complete magnetic mirror bias cancellation, where the time intervals of each half cycle of the magnetic mirrors are equal, regardless of the operating mode of the mirrors and furthermore avoids a need for extreme coating precision and the attendant high costs.

While the invention has been particularly shown and described with respect to a preferred embodiment thereof, it will be understood by those skilled in the art that changes in form and details may be made therein without departing from the scope and spirit of the invention.

What is claimed is:

1. A ring laser angular rate sensor comprising:
    means for generating two counter-propagating optical beams traveling in opposite directions about an optical path defined by a plurality of reflectors, wherein a first one of the reflectors is comprised of a first magnetic mirror means and a second one of the reflectors is comprised of a second magnetic mirror means; and,
    control means coupled to the first and the second magnetic mirror means for controllably energizing the first and the second magnetic mirror means, each of the magnetic mirror means being responsive to an associated input from the control means for biasing the ring laser angular rate sensor to a desired operating point away from lock-in regions.

2. A ring laser angular rate sensor as set forth in claim 1 wherein the first one of the magnetic mirror means further includes optical path length control means for maintaining the optical path at a desired value.

3. A ring laser angular rate sensor as set forth in claim 1 wherein the control means has an input for receiving an angular rate signal and is responsive thereto for controllably energizing the first and the second magnetic mirror means in an additive mode of operation for angular rates below a threshold angular rate value.

4. A ring laser angular rate sensor as set forth in claim 3 wherein the control means is further responsive to the angular rate signal for controllably energizing the first and the second magnetic mirror means in a subtractive mode of operation for angular rates at and above the threshold value.

5. A ring laser angular rate sensor as set forth in claim 4 wherein the threshold value is a rotational rate value selected to maintain at least amount of noise over a range of rotational rates of the ring laser angular rate sensor.

6. A ring laser angular rate sensor as set forth in claim 5 wherein the threshold value is within a range of approximately 50% to approximately 70% of an equivalent magnetic mirror bias rate.

7. A ring laser angular rate sensor as set forth in claim 4 and further comprising means for switching the first and the second magnetic mirror means including means for energizing an easy axis of each of the magnetic mirror means and means for subsequently simultaneously energizing a hard axis of each of the magnetic mirror means such that the first and the second magnetic mirror means switch simultaneously.

8. A ring laser angular rate sensor as set forth in claim 4 wherein the threshold value is a rotational rate value selected to minimize scale factor error.

9. A ring laser angular rate sensor as set forth in claim 8 wherein the threshold value is within a range of approximately 50% to approximately 70% of an equivalent magnetic mirror bias rate.

10. In a ring laser angular rate sensor comprising means for generating two counter-propagating optical beams traveling in opposite directions about an optical path defined by a plurality of reflectors, the rate sensor further comprising a first magnetic mirror means as one of the reflectors, the improvement comprising a second magnetic mirror means as another one of the reflectors and further comprising control means for controllably energizing the first magnetic mirror means and the second magnetic mirror means for biasing the ring laser angular rate sensor to a desired operating point.

11. A ring laser angular rate sensor as set forth in claim 10 wherein the control means has an input for receiving a sensor input rate signal and is responsive thereto for controllably energizing the first magnetic mirror means and the second magnetic mirror means in an additive mode of operation for a first range of sensor input rates, in a subtractive mode of operation for a second range of sensor input rates and further comprises means for switching between the additive mode of operation and the subtractive mode of operation when the sensor input rate signal crosses a rotational rate threshold value, the threshold value being a rotational rate value selected to maintain a least amount of noise over a range of rotational rates of the ring laser angular rate sensor.

12. A ring laser angular rate sensor as set forth in claim 11 wherein the threshold value is within a range of approximately 50% to approximately 70% of an equivalent magnetic mirror bias rate.

13. A ring laser angular rate sensor as set forth in claim 10 wherein the control means has an input for receiving a sensor input rate signal and is responsive thereto for controllably energizing the first magnetic mirror means and the second magnetic mirror means in an additive mode of operation for a first range of sensor input rates, in a subtractive mode of operation for a second range of sensor input rates and further comprises means for switching between the additive mode of operation and the subtractive mode of operation when the sensor input rate signal crosses a rotational rate threshold value, the threshold value being a rotational rate value selected to minimize scale factor error.

14. A ring laser angular rate sensor as set forth in claim 13 wherein the threshold value is within a range of approximately 70% to approximately 70% of an equivalent magnetic mirror bias rate.

15. A method of operating a ring laser angular rate sensor, comprising the steps of:

positioning a first and a second magnetic mirror means within an optical path of the rate sensor;

determining a sensor input rate of the rate sensor;

switchably energizing both the first and the second magnetic mirror means one with the other to produce a combined optical additive effect to bias the rate sensor at a first desired operating point when the determined sensor input rate is less than a threshold value; and, switchably energizing both the first and the second magnetic mirror means one with the other to produce a combined optical subtractive effect to bias the rate sensor at a second desired operating point when the determined sensor input rate is at least equal to the threshold value.

16. A method as set forth in claim 15, wherein the threshold value is a rotational rate value selected to maintain a least amount of noise over a range of rotational rates of the rate sensor.

17. A method as set forth in claim 16 wherein the threshold value is within a range of approximately 50% to approximately 70% of an equivalent magnetic mirror bias rate.

18. A method as set forth in claim 15, wherein the threshold value is a rotational rate value selected to minimize scale factor error.

19. A method as set forth in claim 18 wherein the threshold value is within a range of approximately 50% to approximately 70% of an equivalent magnetic mirror bias rate.

20. A ring laser angular rate sensor, comprising:

means for positioning first and second magnetic mirror means within an optical path of the rate sensor;

means for determining sensor input rates of the rate sensor;

means for switchably energizing both the first and the second magnetic mirror means one with the other to produce a combined optical additive effect to bias the rate sensor at a first desired operating point when the determined sensor input rate is less than a threshold value; and, means for switchably energizing both the first and the second magnetic mirror means one with the other to produce a combined optical subtractive effect to bias the rate sensor at a second desired operating point when the determined sensor input rate is at least equal to the threshold value.

* * * * *